(12) United States Patent
Leone et al.

(10) Patent No.: US 11,155,349 B2
(45) Date of Patent: Oct. 26, 2021

(54) METHOD AND APPARATUS FOR ECONOMICAL REFUELING OF DRONES

(71) Applicant: Ford Global Technologies, LLC, Dearborn, MI (US)

(72) Inventors: Thomas G. Leone, Ypsilanti, MI (US); Kenneth James Miller, Canton, MI (US); Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/761,517

(22) PCT Filed: Nov. 6, 2017

(86) PCT No.: PCT/US2017/060125
§ 371 (c)(1),
(2) Date: May 5, 2020

(87) PCT Pub. No.: WO2019/089052
PCT Pub. Date: May 9, 2019

(65) Prior Publication Data
US 2020/0262556 A1    Aug. 20, 2020

(51) Int. Cl.
*B64C 39/00*     (2006.01)
*B64C 39/02*     (2006.01)
(Continued)

(52) U.S. Cl.
CPC .......... *B64C 39/024* (2013.01); *G05D 1/101* (2013.01); *B64C 2201/141* (2013.01); *G08G 5/0069* (2013.01)

(58) Field of Classification Search
CPC ............... B64C 39/024; B64C 2201/141; G05D 1/101; G08G 5/0069
See application file for complete search history.

(56) References Cited

U.S. PATENT DOCUMENTS 9,139,310 B1 * 9/2015 Wang ................. B64C 39/024
9,256,225 B2    2/2016 Downey et al.
(Continued)

FOREIGN PATENT DOCUMENTS

CN    202929383 U    5/2013
CN    106114865 A *  11/2016
(Continued)

OTHER PUBLICATIONS

Tseng, Chien-Ming. et al. Flight Tour Planning with Recharging Optimization for Battery-operated Autonomous Drones. Department of EECS, Masdar Institute of Science and Technology. Mar. 29, 2017. 10 pages.
(Continued)

*Primary Examiner* — Peter D Nolan
*Assistant Examiner* — Peter Y Ning
(74) *Attorney, Agent, or Firm* — Gregory P. Brown; Brooks Kushman P.C.

(57) ABSTRACT

A drone control method is provided. The method may be responsive to drone recharge energy cost being greater than a predefined threshold and include commanding a processor of the drone to execute actions that preclude the drone from recharging. The method may also be responsive to drone charge level falling below a charge threshold selected only while the drone recharge energy cost exceeds the predefined threshold and include commanding the processor to execute actions to recharge the drone.

18 Claims, 4 Drawing Sheets

(51) Int. Cl.
*G05D 1/10* (2006.01)
*G08G 5/00* (2006.01)

(56) References Cited

U.S. PATENT DOCUMENTS

| | | | | |
|---|---|---|---|---|
| 9,376,208 B1* | 6/2016 | Gentry | ............ | G08G 5/006 |
| 9,387,928 B1* | 7/2016 | Gentry | ............ | G08G 5/0052 |
| 9,454,157 B1* | 9/2016 | Hafeez | ............ | B64C 39/024 |
| 2014/0032034 A1* | 1/2014 | Raptopoulos | ........ | G05D 1/0088 |
| | | | | 701/25 |
| 2015/0314869 A1* | 11/2015 | Lemus Martin | ..... | G05D 1/0005 |
| | | | | 701/3 |
| 2015/0336669 A1 | 11/2015 | Kantor et al. | | |
| 2015/0370251 A1* | 12/2015 | Siegel | ............ | G05D 1/00 |
| | | | | 701/2 |
| 2016/0196756 A1* | 7/2016 | Prakash | ............ | G08G 5/025 |
| | | | | 701/3 |
| 2016/0364989 A1* | 12/2016 | Speasl | ............ | G08G 5/0082 |
| 2017/0160735 A1* | 6/2017 | Mikan | ............ | G08G 5/0034 |
| 2017/0162060 A1* | 6/2017 | Boland | ............ | G08G 5/0069 |

FOREIGN PATENT DOCUMENTS

| | | |
|---|---|---|
| CN | 106768123 A | 5/2017 |
| KR | 20160037473 A | 6/2016 |
| KR | 101679823 B1 | 11/2016 |

OTHER PUBLICATIONS

International Search Report of the International Searching Authority for PCT/US2017/060125 dated Jan. 5, 2018.

* cited by examiner

METHOD AND APPARATUS FOR ECONOMICAL REFUELING OF DRONES

CROSS-REFERENCE TO RELATED APPLICATION

This application is the U.S. national phase of PCT Application No. PCT/US2017/060125, filed Nov. 6, 2017, the disclosure of which is hereby incorporated in its entirety by reference herein.

TECHNICAL FIELD

This disclosure relates to a control system and method for operating a drone.

BACKGROUND

Operating conditions of a drone may alter the ability of the drone to refuel or recharge in an economically efficient manner or refuel or recharge generally. For example, severe weather conditions due to high winds and other variables may prevent the drone from landing and docking at a charging or refueling station. As another example, if the demand and associated cost for recharging the drone is above a threshold, the owner/operator of the drone may delay charging the drone to avoid the higher cost. Finally, recharging or refueling during a time that conflicts with an already planned use may delay or risk completion of the predefined tasks or routes.

SUMMARY

According to one embodiment of this disclosure, a drone control method is provided. The method may be responsive to drone recharge energy cost being greater than a predefined threshold and include commanding a processor of the drone to execute actions that preclude the drone from recharging. The method may also be responsive to drone charge level falling below a charge threshold that is selected only while the drone recharge energy cost exceeds the predefined threshold and include commanding the processor to execute actions to recharge the drone.

According to another embodiment of this disclosure, a drone is provided. The drone may include a processor and a controller. The controller may be programmed to, in response to drone recharge energy cost being greater than a predefined threshold, commanding the processor of the drone to execute actions that preclude the drone from recharging and responsive to drone charge level falling below a threshold that is selected only while the drone recharge energy cost exceeds the predefined threshold, commanding the processor to execute actions to recharge the drone.

According to yet another embodiment of this disclosure, a drone control method is provided. The method may be responsive to expected in-use time use falling below a predetermined threshold and include commanding a processor of the drone to execute actions to recharge. The method may also be responsive to drone charge/fuel level exceeding a charge threshold selected only while the planned drone use falls below the predefined threshold and include commanding the processor to execute actions to recharge/refuel the drone.

DETAILED DESCRIPTION

Figure 1:
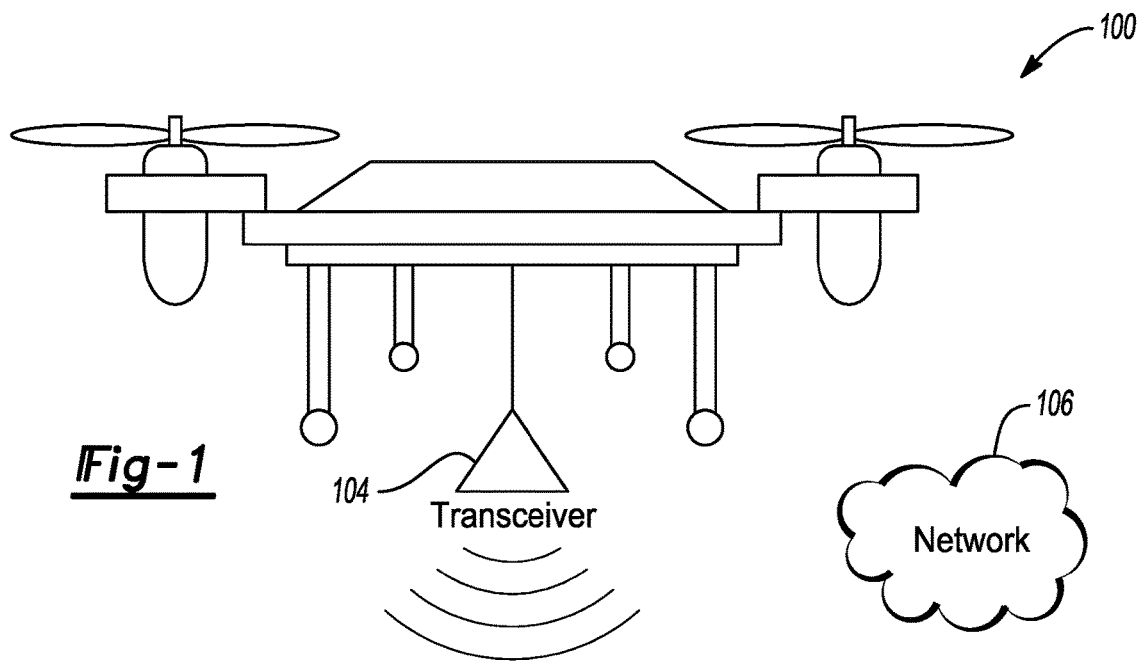
FIG. 1 is a perspective view of a drone and a network.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Circumstances surrounding a planned flight plan of a drone may alter the feasibility to refuel or recharge the drone or do so in an economically-efficient manner. For example, if the cost associated with refueling or recharging is above a predetermined cost, due to current demand or a forecasted demand for electricity being relatively high, the drone may delay refueling or recharging until the fuel or charge level is below a predetermined threshold, or until the demand decreases, or both. As another example, if the quality of air or weather conditions decreases the ability of the drone to safely refuel or recharge, the drone may delay refueling or recharging.

The drone may be of any type (e.g., fixed-wing or rotary-wing). The drone may be configured with positioning sensors, such as a global positioning system (GPS), proximity sensors and indicators (e.g., ultrasonic, photoelectric, capacitive, or inductive). The drone may be configured to avoid collisions with objects in the surrounding area (e.g., trees, buildings, etc.) based on the proximity indications. The drone may be further configured with a dust sensor capable of measuring a dust concentration, a wind speed and directional sensor, and a powertrain temperature sensor. For example, the drone may forgo charging or fueling if the concentration of dust or the wind speed makes refueling or recharging the drone unfavorable. As another example, if the drone is powered by an internal combustion engine, the temperature sensor may be configured to determine the existence of a cold-start condition that may cause the internal combustion engine to operate inefficiently and delay or forgo operating the drone to refuel. The drone may include a fuel or charge sensor that is configured to determine the drone's fuel or charge level and compare that level to an estimated fuel or charge quantity that will be consumed during a predefined route or schedule.

The drone may receive a communication signal from an operator, owner, or some third party. The signal may be sent from a satellite or communications tower. The signal may include a predefined schedule of flight commands, e.g., delivery schedule, pick up or drop off tasks, etc. The communication signal from a third party may include past, current, and future weather conditions. This drone may process this information to alter its planned course or delivery schedule. The signal from a third party may also include pricing information, both present and future, for fuel or electricity, and the load or demand on an electrical grid used for charging the drone.

The drone may use a controller to evaluate the information received from communication signals and an algorithm to assign a value for each factor or variable received. A threshold may be associated with each factor: the closer the measured value is to the threshold the likelihood or urgency of the drone to refuel or recharge increases. The algorithm may also sum each of the variables together and compare that value to another predetermined threshold.

Now referring to FIG. 1, a drone 100 is shown. While the drone 100 illustrated is the rotary type, other configurations such as fixed wing may be used. The drone 100 includes a transceiver 104 that may communicate with the network 106. The transceiver of the drone 104 may use any available wireless protocol or ad-hoc communications protocols (e.g., Bluetooth Low Energy (BLE), Dedicated Short Range Communications (DSRC), Long Range Wide Area Network (LoRa), and 802.11).

Figure 2:
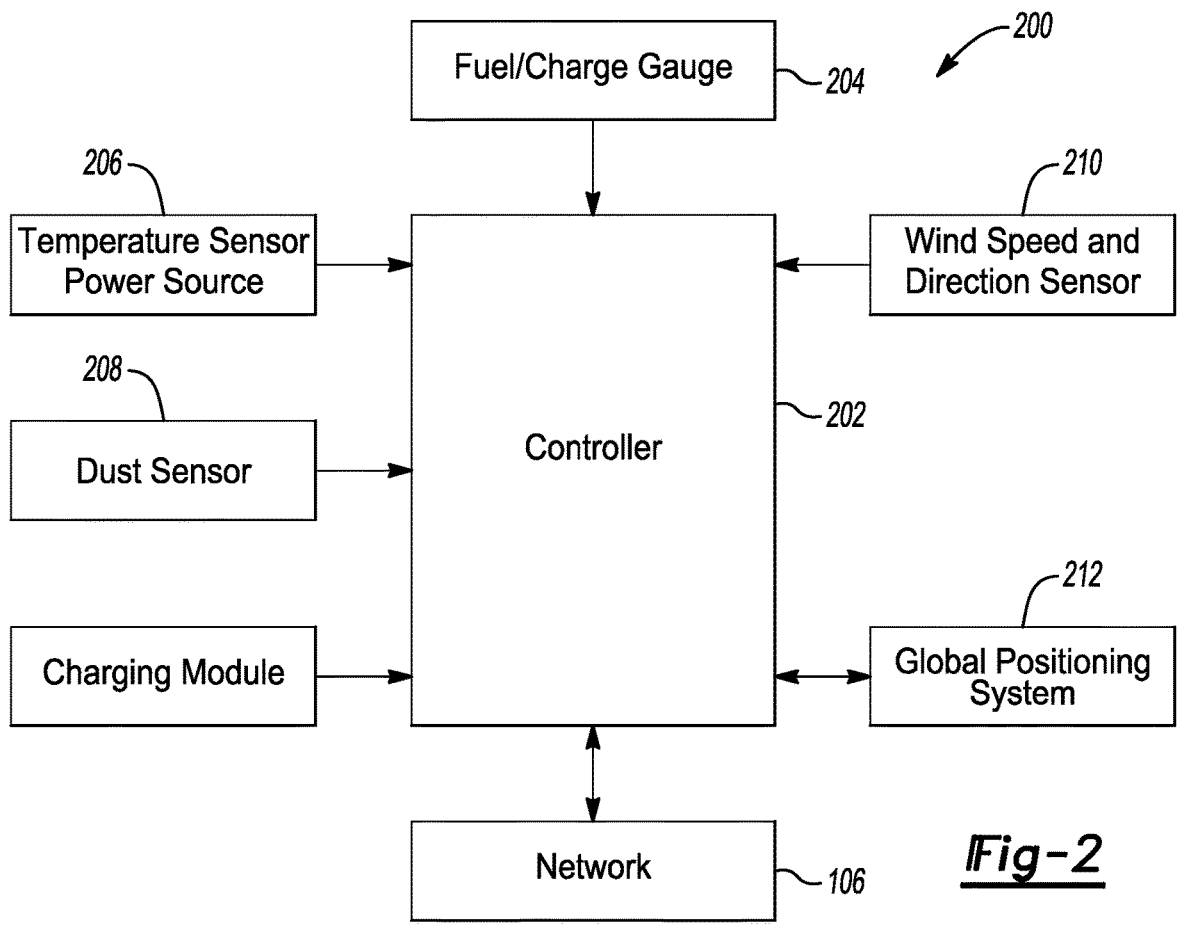
FIG. 2 is a schematic diagram of an exemplary operating system for a drone.

Now referring to FIG. 2, a schematic diagram for controlling the drone 100 is shown. The drone 100 further includes a controller 202, while illustrated as one controller, the controller 202 may be part of a larger control system and may be controlled by various other controllers throughout the drone 100. The controller 202 and one or more other controllers can collectively be referred to as a "controller" that controls various actuators in response to signals from various sensors to control functions such as taking off, landing, executing a planned route, recharging, refueling, etc. The controller 202 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the motors, engine, or drone 100.

The drone 100 may include a fuel gauge or charge gauge 204 that is configured to determine the amount of fuel or the charge level stored within the drone 100. The fuel or charge gauge is configured to communicate these values to the controller 202. The controller 202 may determine whether the measured value of fuel or charge is sufficient to meet the planned route. The controller 202 may also compare this value against a known threshold: if the measured value meets the threshold, a factor associated with the urgency to refuel or recharge will increase.

The drone 100 may further include a power source temperature sensor 206. The power source temperature sensor 206 may measure the ambient air temperature surrounding the power source or the temperature of the power source (e.g., electric motor or internal combustion engine). The sensor 206 may communicate this measured value to the controller 202, the controller may then calculate or determine an associated operating efficiency for the given measurement. The controller 202 may also compare this value against a known threshold: if the measured value meets the threshold, a factor associated with the urgency to refuel or recharge will increase.

The drone 100 may further include a dust sensor 208. The dust sensor may determine a dust concentration or particulate matter level (PM level) in the air surrounding the drone. The dust sensor 208 may accomplish by counting the low pulse occupancy time (LPO time) in given time unit. In other embodiments, the dust sensor 208 may be an optical sensor that utilizes an infrared emitting diode and a phototransistor. The dust sensor 206 may communicate a measured value to the controller 202 and the controller 202 may then compare this value to a known threshold: if the measured value is above the threshold, a factor associated with the urgency to refuel or recharge will decrease, to avoid, forgo, or delay refueling or recharging the drone.

In addition to the dust sensor 208, the drone 100 may further include a wind speed sensor 210. The wind speed sensor or anemometer 210 measures the velocity and direction of the wind and communicates that measurement to the controller 202. The controller may then compare this value to a known threshold: if the measured value is above the threshold, a factor associated with the urgency to refuel or recharge will decrease, to avoid, forgo, or delay refueling or recharging the drone. The drone 100 may further include a GPS 212 that is configured to determine the geolocation and time information of the drone and any planned destinations the drone 100 may travel to.

Now referring to FIGS. 3A-3I graphs of various factors used in planning or a method of determining whether or when to refuel or recharge the drone 100 are shown. Each of the graphs include a y-axis that indicates an integer value for each factor. For simplicity's sake, the value illustrated is 1, though other values may be utilized. The graphs are not necessarily to scale, but are shown this way for clarity. The graphs 3A-3I also includes an x-axis that indicates variables associated with each factor (e.g., the x-axis of the fuel/charge factor denotes the level of fuel or amount of charge available). The graphs further include a dotted threshold line T. When the graphed line is at or near the threshold T, the processor of the drone is commanded to increase the urgency of the drone 100 to refuel. Each of the graphs represent a calibratable function that is incorporated within the logic of a controller.

Figure 3A:
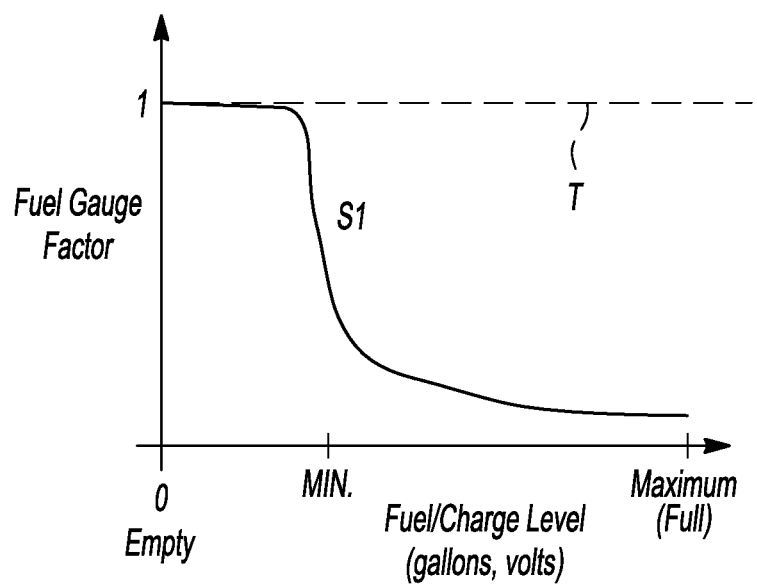
FIG. 3A-3I are graphs illustrating various factors the operating system may take into account when deciding to refuel or recharge.

FIG. 3A is a graph illustrating a fuel gauge factor. The origin of the graph represents a charge level of zero or empty. A minimum value of the fuel or charge level is approximately positioned right of the origin. Between the origin and the minimum value, the line S1 closely follows the dotted threshold line T. At this point the urgency to refuel or recharge the drone may be at its highest. The line S1 sharply falls after the minimum value, and levels out until the maximum charge or full fuel point.

Figure 3B:
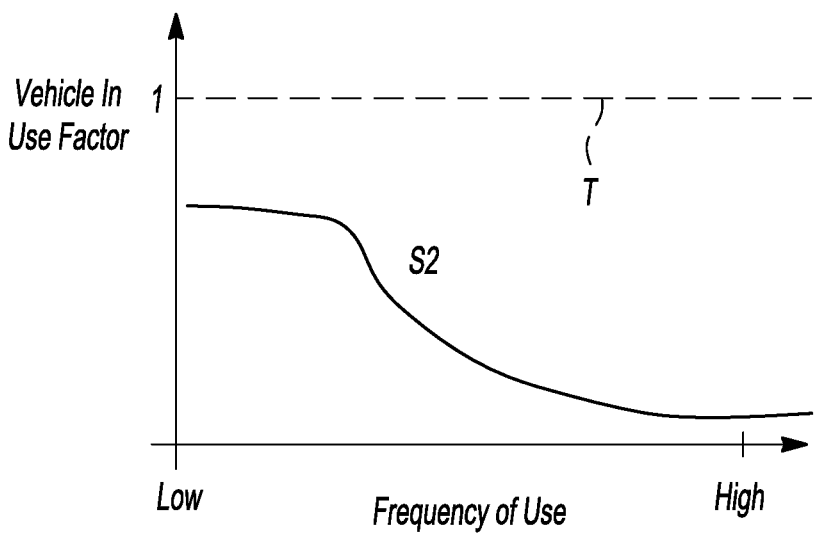

FIG. 3B is a graph of the drone refueling factor as it relates to the drone or vehicle in use factor. A low use or low frequency of use (e.g., no planned trips for a predetermined period) is represented by the origin on the x-axis. If relatively few planned trips are predicted, the plotted line S2 is positioned near the threshold T. As the plotted line moves across the x-axis, the number of planned trips increases, therefore the urgency to refuel or recharge is lessened.

Figure 3C:
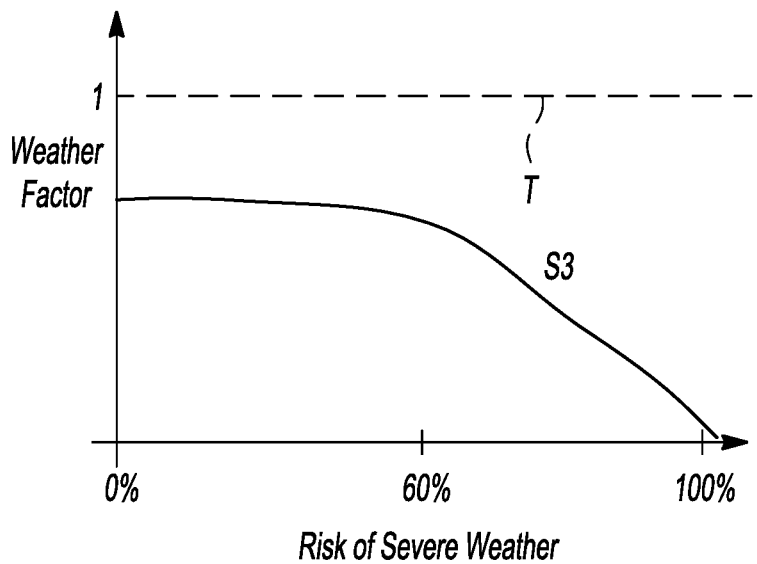

FIG. 3C is a graph of the drone refueling factor as it relates to severe weather conditions. A low likelihood or 0% chance of severe weather (e.g., thunderstorms, high wind, or snow storms) is represented by the origin on the x-axis. At the right end of the x-axis the chance of severe weather is 100%. The plotted line S3 is relatively constant, staying approximately 25% below the dotted threshold line T, from the origin or 0% and the inflection point near 60%. After the line S3 reaches the inflection point, it extends downwardly at a relatively linear rate towards origin of the y-axis.

Figure 3D:
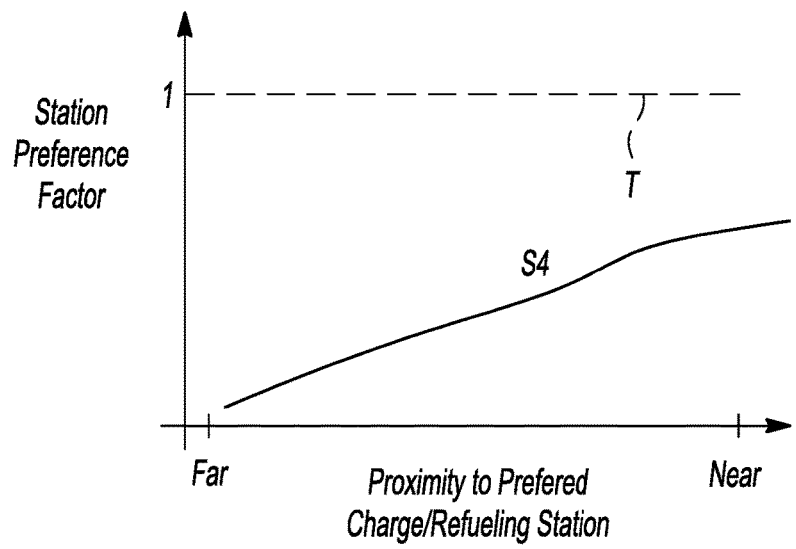

FIG. 3D is a graph of the drone refueling factor as it relates to a refueling or recharging station preference factor. The x-axis represents the relative distance or proximity of the drone's present location to a preferred recharging or refueling station. Depending on the configuration of the drone (amount of fuel or charge the drone can hold or maintain) the distances may increase or decrease. Near the origin point on the x-axis, the relative proximity of the drone and a preferred station is "far," to the right of this point is "near." The closer the plotted line S4 is to the x-axis the lower the urgency for the drone to refuel is. The plotted line S4 is relatively linear between the "far" point on the x-axis and begins to decrease in slope near the "near" point on the same.

Figure 3E:
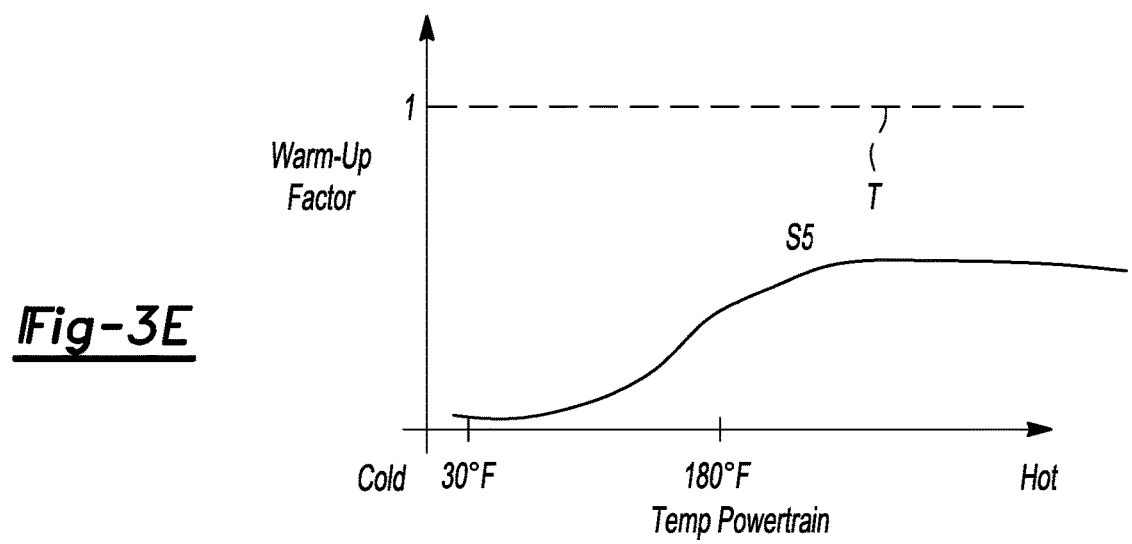

FIG. 3E is a graph of the drone refueling factor as it relates to the temperature of the powertrain of the drone. The x-axis of the represents or indicates the temperature of the powertrain of the drone. The temperature of a powertrain may have an impact on the level of efficiency the drone can achieve, particularly if the drone is powered by one or more internal combustion engines. The x-axis, near the origin, represents a "cold" temperature (<30° F.) and to the right of that is a point that represents "hot." A mid-point is located along the x-axis in between the cold and hot points. The plotted line S5 extends from the origin point of the y-axis.

Figure 3F:
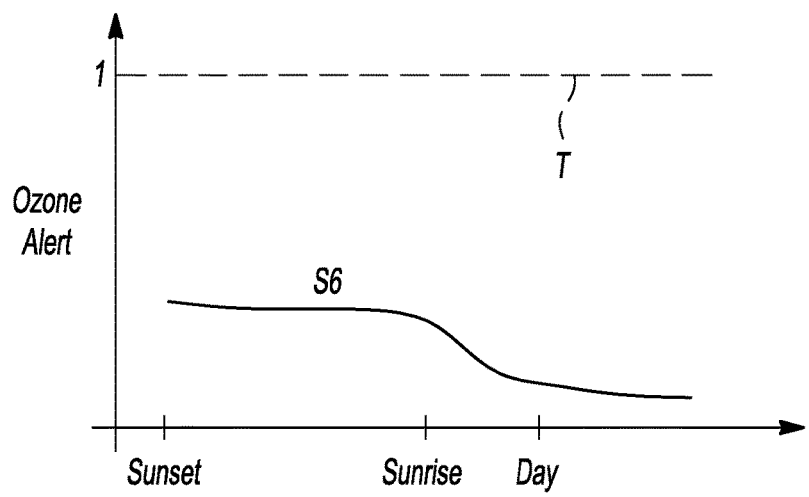

FIG. 3F is a graph of the drone refueling factor as it relates to an air quality index. The air quality index may be correlated to the amount or concentration of ground-level ozone near the drone. The air quality index may be determined and published by a government entity, such as the Environmental Protection Agency or other organization. As an example, the air index may range between 0, good with little ground-level ozone, and 500, a hazardous level. More specifically, the air quality index may be divided into six levels: good (0-50), moderate 51-100, unhealthy for sensitive groups (101-150), unhealthy (151-200), very unhealthy (201-300), and hazardous (301-500). Government authorities may prevent or discourage citizens from driving, flying, traveling, recharging or refueling their vehicles when the air quality index is above a certain level. The plotted line S6 is relatively flat and extends between the good and unhealthy points on the x-axis. The plotted line meets an inflection point approximately in line with unhealthy rating. The line S6 decreases at a linear rate until it is again flat near the origin of the y-axis.

Figure 3G:
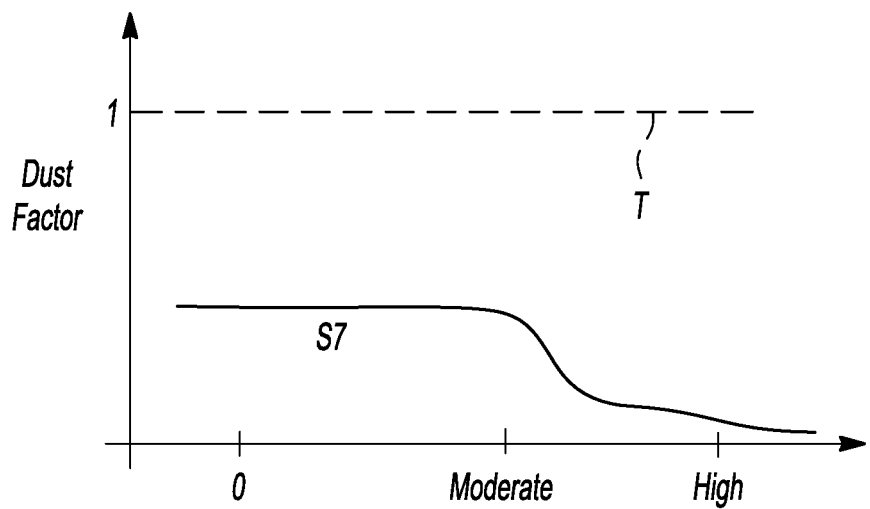

FIG. 3G is a graph of the drone refueling factor as it relates to an ambient dust concentration. The presence or high concentration of dust or similar particulate within the surrounding air of the drone may inhibit the drone from executing required maneuvers to recharge or refuel. The concentration of dust may be measured by a dust concentration within a given volume. The dust concentration may range between 0 pieces per liter, medium, and high. The term high may represent 28,000 pieces per liter, though other units of measurement may be utilized. The plotted line S7 extends between 0 pieces per liter to 20,000 pieces per liter. The line S7 reaches an inflection point and descends to towards the origin of the y-axis as it approaches 28,000 pieces per liter.

Figure 3H:
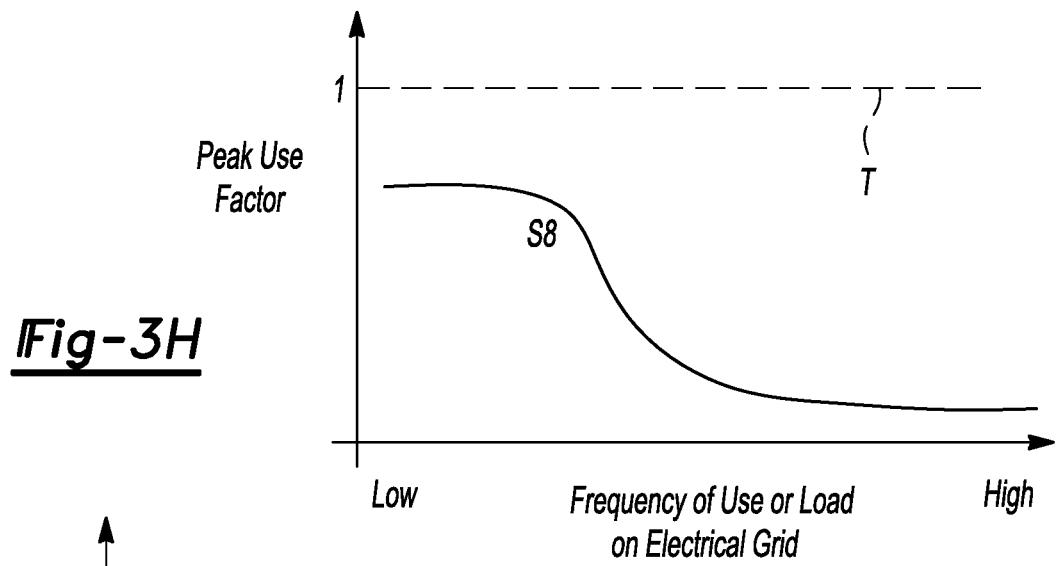

FIG. 3H is a graph of the drone refueling factor as it relates to the peak drone usage or the peak electrical load on an electrical grid that the drone may use to recharge. The x-axis may represent the planned frequency of the drone or the peak usage or load on the electrical grid. Near the origin of the x-axis, little or few planned trips or tasks are planned for the drone. At this point, the load or usage of the electrical grid may be relatively low. The load or usage of the electrical grid may be typically less at night or in the early morning hours. The line S8 begins at a position above the origin, approximately three-quarters of the distance between the threshold and the x-axis. The line S8 horizontally extends until an inflection point, where it then sharply decreases and extends parallel to the x-axis.

Figure 3I:
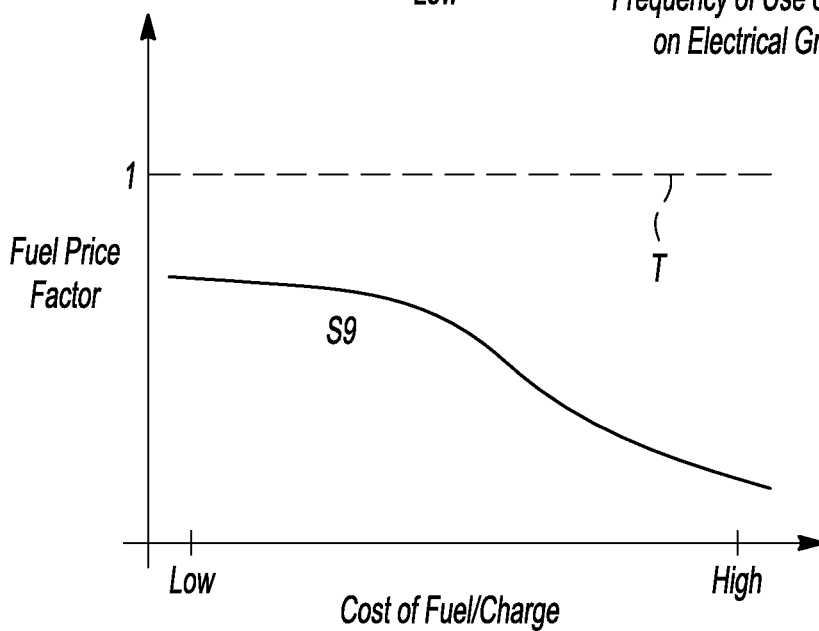

FIG. 3I is a graph of the drone refueling factor as it relates to the cost associated with charging or refueling the drone. The x-axis includes a low cost near the origin point and extends to a high cost point. The terms low and high may be relative to the economic value the drone is performing. As an example, if the drone is delivering or performing a high value item or high value task, the low or high range of charging or refueling the drone may be higher. The line S9 is relatively flat and near the dotted threshold line T between the low and mid fuel or charge cost points. The line S9 then descends rather sharply towards the high cost to refuel or recharge point.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A drone control method comprising:
responsive to drone recharge energy cost being greater than a predefined threshold and an ambient dust concentration being greater than a dust concentration threshold, commanding a processor of the drone to execute actions that preclude the drone from recharging for a predetermined period; and
responsive to drone charge level falling below a charge threshold that is selected only while the drone recharge energy cost exceeds the predefined threshold, commanding the processor to execute actions to recharge the drone.

2. The method of claim 1 wherein the predefined threshold changes according to the drone charge level.

3. The method of claim 1 wherein the predetermined period terminates responsive to the drone recharge energy cost falling below the predefined threshold.

4. The method of claim 1 wherein the commanding the processor that precludes the drone from recharging is further responsive to an electrical demand on an energy grid exceeds a predetermined-electrical-demand threshold.

5. The method of claim 1 wherein the commanding the processor that precludes the drone from recharging is further responsive to a number of pre-determined flight commands exceeding a predetermined-flight-command threshold.

6. The method of claim 1 wherein the commanding the processor that precludes the drone from recharging is further responsive to a risk of severe weather exceeding a predetermined weather threshold.

7. The method of claim 1 further comprising receiving a measured value of the ambient dust concentration from a dust sensor.

8. A drone comprising:
a processor; and
a controller programmed to, in response to drone recharge energy cost being greater than a predefined threshold, commanding the processor of the drone to execute actions that preclude the drone from recharging, and responsive to drone charge level falling below a threshold that is selected only while the drone recharge energy cost exceeds the predefined threshold, commanding the processor to execute actions to recharge the drone.

9. The drone of claim 8, wherein the predefined threshold changes according to the drone charge level.

10. The drone of claim 9, wherein the predefined threshold is non-linear.

11. The drone of claim 8, wherein the controller is further programmed to, in response to ambient dust concentration being greater than a dust concentration threshold, preclude the drone from recharging.

12. The drone of claim 8, wherein the controller is further programmed to, in response to a number of pre-determined flight commanding exceeds a predetermined-flight-command threshold, preclude the drone from recharging.

13. The drone of claim 8, wherein the controller is further programmed to, in response to an air quality index exceeding a predetermined air quality index threshold, preclude the drone from recharging.

14. A drone comprising:
a dust sensor;
a processor; and
a controller programmed to:
receive a measured value of ambient dust concentration from the dust sensor,
responsive to drone recharge energy cost being greater than a predefined threshold and the measured valve of ambient dust concentration being greater than a dust concentration threshold, command a processor of the drone to execute actions that preclude the drone from recharging for a predetermined period, and
responsive to drone charge level falling below a charge threshold that is selected only while the drone recharge energy cost exceeds the predefined threshold, command the processor to execute actions to recharge the drone.

15. The drone of claim 14, wherein the predefined threshold changes according to the drone charge level.

16. The drone of claim 15, wherein the predefined threshold is non-linear.

17. The drone of claim 14, wherein the controller is further programmed to, in response to a number of pre-determined flight commanding exceeds a predetermined-flight-command threshold, preclude the drone from recharging.

18. The drone of claim 14, wherein the controller is further programmed to, in response to an air quality index exceeding a predetermined air quality index threshold, preclude the drone from recharging.

* * * * *